United States Patent [19]

Edwards

[11] 3,832,912
[45] Sept. 3, 1974

[54] HANDLEBAR SAFETY SHIELD
[76] Inventor: Daniel W. Edwards, 211 Sherman, Goodland, Kans. 67735
[22] Filed: Feb. 22, 1973
[21] Appl. No.: 334,742

[52] U.S. Cl. .................................. 74/551.8, 2/17
[51] Int. Cl. .............................. B62k 21/26
[58] Field of Search ....... 74/551.8, 551.9, 488, 489; 2/17; 296/78.1

[56] References Cited
UNITED STATES PATENTS

| 626,633 | 6/1899 | Robinson | 74/551.9 |
| 1,580,724 | 4/1926 | Harmon | 74/551.9 |
| 2,063,493 | 12/1936 | Douglas | 74/551.8 |
| 2,591,523 | 4/1952 | Dick | 74/551.8 X |
| 3,462,188 | 8/1969 | Edgar | 74/551.8 |

FOREIGN PATENTS OR APPLICATIONS

| 515,768 | 2/1955 | Italy | 74/551.8 |
| 541,277 | 3/1956 | Italy | 2/17 |
| 454,974 | 7/1913 | France | 74/551.9 |
| 467,654 | 6/1914 | France | 74/551.9 |

Primary Examiner—Samuel Scott
Assistant Examiner—F. D. Shoemaker

[57] ABSTRACT

A handlebar safety shield fitted about the gripping control surfaces of a motorcycle handlebar in a manner to provide a protective shield for the hands of the motorcycle operator and to the hand controls of the motorcycle.

2 Claims, 5 Drawing Figures

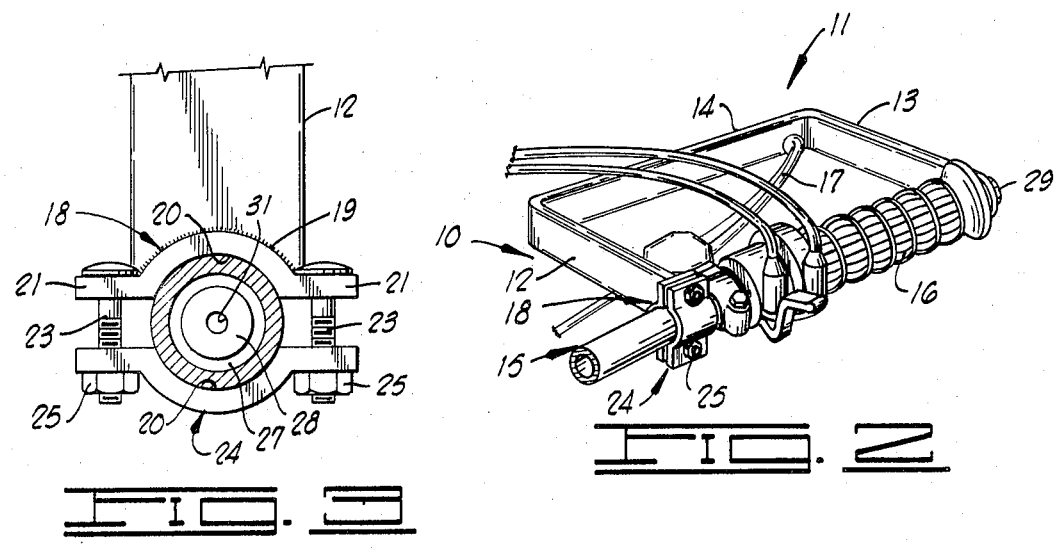
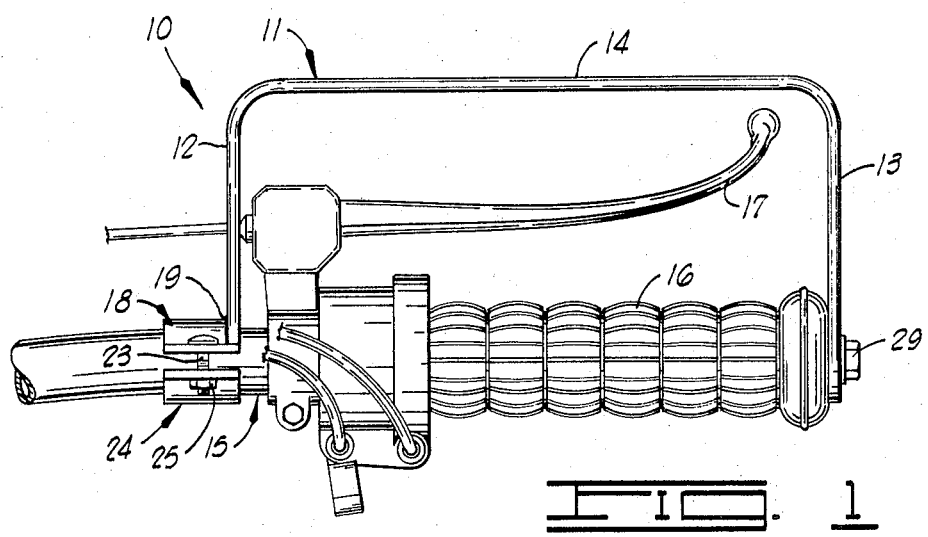
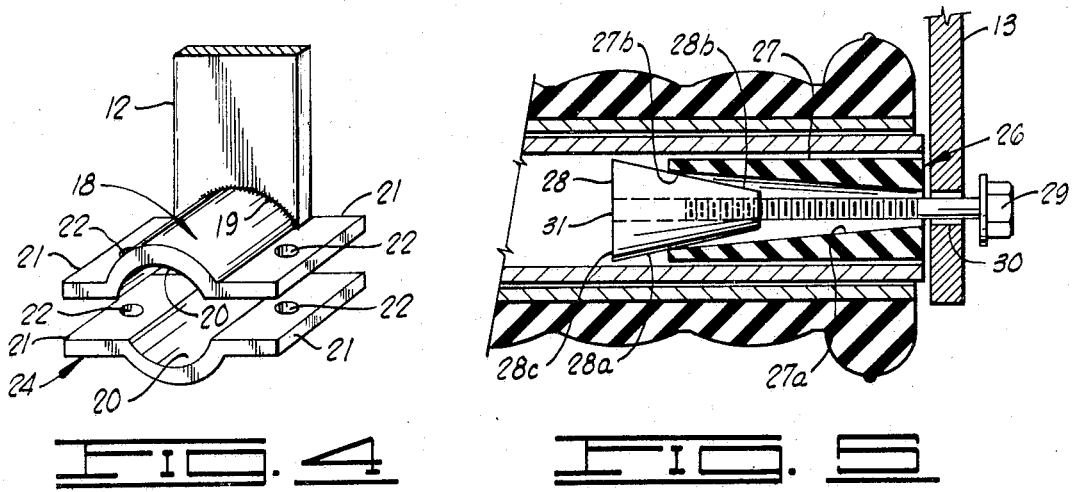

HANDLEBAR SAFETY SHIELD

BACKGROUND OF THE INVENTION

1. Field of the Invention

The present invention relates to improvements in handlebar safety shields and more particularly, but not by way of limitation, to an improved safety shield for motorcycle handlebars.

2. Description of the Prior Art

In the field of accessories for motorcycle vehicles and the like, there have been a number of accessories for handlebars designed primarily for decorative purposes. Such design accessories usually do not relate to the functional aspect of the safety of the vehicle and operator.

Most motorcycle vehicles are of the two-wheeled variety and thus are self-supporting only while in motion or when supported by a kickstand during parking. The motorcycle's control mechanisms such as accelerator and brake controls are normally positioned on the handlebar. If a motorcycle overturns, the motorcycle will normally strike the ground at its handlebar because the handlebar protrudes a substantial distance from other equipment located near the handlebar. The hand controls located on the handlebar of an overturning motorcycle often receive forceful blows from the fall. It would be a desirable safety feature to have the controls on the handlebar protected from such an occurrence.

The problem of protecting handlebar controls of a motorcycle has heightened in recent years with the increasing use of the motorcycle for off-highway use. The sport of brushrunning (known also by such names as dirtrunning) is now very popular in this country. This sport involves riding a motorcycle on rough terrain instead of the relatively smooth highway surface for which the motorcycle was designed. Many motorcycle operators have found a great thrill in riding motorcycles in hilly and brush country, often at substantially high rates of speed, thereby subjecting themselves and the motorcycle to greater danger of overturning or being struck by low-hanging trees or other obstacles. When this happens, it is important that the handlebar controls be shielded. It is possible for a sudden blow to the accelerator control to lock the accelerator in an open or partially open position, placing the operator in danger by his inability to stop the vehicle. This can be avoided if the handlebar controls are properly protected.

It has not generally been the object of previous handlebar shield designs to encase the handlebar controls in a manner which affords security to the operator's hands and to the controls, while offering unrestricted accessibility to the hands of the operator.

SUMMARY OF THE INVENTION

The present invention provides a handlebar shield having a minimum number of components which attaches to the handlebar of a motorcycle or motorbike, and which provides a protective structure for the hands of the operator and for the control mechanisms that are located on the handlebar. The invention is particularly useful because of its simple design and adaptability to most handlebars.

It is an object of the present invention to provide a handlebar safety shield which is adaptable for attachment to substantially all sizes and shapes of motorcycle handlebars for the protection of the hands of the operator and the handlebar controls.

Another object of the present invention is to provide a simple handlebar safety shield apparatus with a minimum number of components and which is inexpensive to manufacture.

Another object of the present invention is to provide a handlebar safety shield which protects the handlebar control mechanisms and which can be manufactured in a range of functional and decorative designs.

Another object of the present invention is to provide a handlebar safety shield which is rugged and durable, and which has sufficient strength to protect the handlebar controls of an overturning motorcycle.

Another object of the present invention is to provide a handlebar safety shield which is easily assembled and attached to the handlebar of a motorcycle and which is easily removed.

Other objects and advantages of the present invention will become apparent from the following detailed description of the preferred embodiments of the invention, considered in conjunction with the accompanying drawings.

BRIEF DESCRIPTION OF THE DRAWINGS

FIG. 1 is a top view of the handlebar safety shield attached at the end of a handlebar.

FIG. 2 is a perspective view of the handlebar safety shield attached to the end of a handlebar.

FIG. 3 is an end view showing the support member bracket as attached with its holding bracket to a handlebar.

FIG. 4 is a perspective view of the brackets.

FIG. 5 is a partial cutaway view showing the attachment of the outer support member to the expandable slug in the end of a handlebar.

DESCRIPTION OF THE PREFERRED EMBODIMENT

Referring now in more detail to the drawings, in which like numerals indicate like parts throughout the several views, FIG. 1 shows the handlebar safety shield generally at 10. The handlebar safety shield is comprised of an elongate bar 11 which has been formed into a U-shaped configuration. The ends of the elongate bar form an inner support member 12 and an outer support member 13, while the remaining portion of the elongate bar serves to form safety shield 14. It will be understood that for purposes of illustration here, a continuous elongate bar has been formed into a shape in which the safety shield and the support members are made from the same piece of material, but support members may be provided independently and attached to the safety shield 14. While an elongate bar is discussed herein for purposes of illustration, it is possible to apply the principles of the present invention to a handlebar safety shield having various shapes and designs, each of which will serve to provide a rugged, strong shield to protect the operator's hands and the handlebar controls.

A typical installation of the apparatus of this invention to the handlebar of a motorcycle or the like will require a safety shield as described herein attached at each end of the handlebar. The discussion herein will describe a single handlebar safety shield 10 as in FIG. 1.

A typical handlebar end 15 as shown in FIG. 1 is hollow, to which accelerator grip control 16 and brake control 17 are attached. The inner support member 12 is welded to support member bracket 18 at weld seam 19, which may better be seen in FIG. 4. Support member bracket 18 is shaped to have an inner surface 20 having a diameter of curvature slightly greater than the outer diameter of handlebar 15, the center of curvature being approximately the same as that of the handlebar so that the surface 20 readily fits over the handlebar as shown in FIG. 3. Support member bracket 18 has protruding flanges 21 which have bolt holes 22 to receive bolts 23. Holding bracket 24 is similar in design to the support member bracket 18, but is an independent member. The flanges 21 of holding bracket 24 are identical in dimension and hole spacings to the flanges 21 of support member bracket 18. When placed opposite to support member bracket 18, the holes 22 in the oppositely placed flanges will receive the holding bolts 23 as shown in FIG. 1. These two brackets when placed in the manner shown in FIG. 3, aligned with and on the opposite side of the handlebar 20, receive bolts 23 and hold the inner support member 12 firmly in place when secured with nuts 25. The inner surfaces 20 of the brackets may be roughened so as to create good binding surfaces to engage with the surface of the handlebar.

The outer support member 13 is attached to the end of the handlebar by the means of an expansion slug 26, which is shown in FIG. 5. Expansion slug 26 comprises an outer slug 27, an inner slug 28, and a slug bolt 29. The end of outer support member 14 next to the handlebar has a bolt hole 30 which is large enough to receive the bolt but which is small enough to prevent the passage therethrough of the head of bolt 29. Outer slug 27 is made of expandable material such as a relatively soft metal or of rubber, and it has an outer diameter which approximates but is smaller than the inner diameter of the handlebar. Outer slug 27 has a tapered hollow core 27a, the cross-section of which can be described as that of a truncated cone. Inner slug 28 is made of a rigid material such as a relatively hard metal, and it is tapered on the sides 28a such that its cross-section can be described as that of a truncated cone. The dimensions of inner slug 28 are selected so that its small end 28b will enter the large end opening 27b of the tapered hollow core 27a of outer slug 27, but its larger end 28c will not. Through the center of inner slug 28 is threaded aperture 31. Inner slug 28 is placed in relation to outer slug 27 in the manner shown in FIG. 5, and slug bolt 29 is passed through aperture 30 and is threadingly engaged with aperture 31. The expansion slug 26 is then placed into the hollow end of handlebar 15, and slug bolt 29 is tightened, causing outer slug 27 to expand against the inner wall of the handlebar.

The dimensions of shield bar 14, inner support member 12, and outer support member 13 are determined so as to frame the control mechanisms as shown in FIG. 1, while permitting ready access to the hand of the operator. The length of inner support member 12 in relation to outer support member 13 is determined such that the support member bracket 18 is secured firmly to the handlebar while causing the aperture 30 in outer support member 13 to align with the center of expansion slug 26. The radial placement of the handlebar safety shield 10 is adjusted, after mounting, to effect a spatial relationship to the handlebar controls so as to give the controls maximum protection.

OPERATION

In operation the safety shield of the present invention is readily installed on most handlebar designs without modification of the handlebar. A safety shield constructed in the embodiment discussed above is installed by placing slug bolt 29 through aperture 30 of outer support member 13, passing bolt 29 through outer slug 27, and threadingly engaging threaded aperture 31 in inner slug 28 in the manner shown in FIG. 5. The expansion slug 26 is then placed into the hollow end of handlebar 15, and slug bolt 29 is tightened to a degree necessary to loosely but firmly hold the outer support member 13 to the handlebar. The length of the outer support member has been predetermined so that safety shield 14 is held at a proper distance from the brake control 17, while causing support member bracket 18, which is attached to inner support member 12, to rest upon the handlebar at an appropriate location. Holding bracket 24 is placed on the opposite side of the handlebar front support member bracket 18 and the holding bolts 23 are passed through corresponding holes of the brackets and secured with the nuts 25. Once the nuts 25 are loosely engaged with the holding bolts 23, the handlebar shield 10 is rotated to a proper alignment over the brake control 17, and while the handlebar shield 10 is in this position, the nuts 25 are tightened as is slug bolt 29. In like manner, a handlebar shield may be mounted on the other end of the handlebar.

In the manner above described, the handlebar safety shield 10 is caused to frame the control mechanism of the handlebar so that they are properly protected. Additionally, elements may be placed on the safety shield in a conventional manner in order to form various designs so as to enhance its appearance. In the alternative, the shape of the handlebar safety shield itself may be varied and numerous designs so as to enhance the appearance thereof.

The safety shield described in the present invention has proved to be strong, durable and rugged. The embodiment herein described requires a minimum time to install on most handlebars, and it is easily dissassembled due to the simplicity of the design and the interchangeability of component parts. The handlebar shield may be removed or simply loosened and rotated to give access for maintenance to the protected control mechanisms.

The handlebar safety shield of the present invention is a simple but yet effective design and therefore inexpensive to manufacture. In addition to requiring a minimum of components, only common machine shop operations are required in its manufacture.

It will be understood that the elements of the present invention may be fabricated from a variety of materials. Typically, steel strap plate is used to fashion the handlebar safety shield and the support members, and the support member bracket is welded to the inner support member. The brackets, expansion slug, and the bolts are conventional metal products, but other materials such as plastic or rubber may be used.

It will be understood that changes may be made in the construction and arrangement of the various parts of the elements of the various embodiments as disclosed herein without departing from the spirit and scope of the invention as described in the following claims.

What is claimed is:

1. A handlebar safety apparatus for motorcycle vehicles and the like having controls thereon adjacent an end of the handlebar, the safety apparatus comprising:

a safety shield made from an elongate bar formed into a U-shaped configuration, the elongate bar thereby forming the safety shield having an outer support member at one end and an inner support member at the other end of the safety shield;

expandable slug means affixed in the end of the handlebar for attaching the outer support member of the safety shield to the end of the handlebar in non-interfering relationship to said controls; and means for attaching the inner support member of the safety shield to the handlebar at a point removed from the end of the handlebar and spaced from the controls.

2. Apparatus as defined in claim 1 wherein the means for attaching the inner support member to the handlebar comprises:

a support member bracket secured to the inner support member;

a holding bracket; and means for engaging and holding the support member bracket and the holding bracket on opposite sides of the handlebar to each other, the brackets placed at a point removed from the end of the handlebar and placed so as to hold the safety shield in spatial relationship to the handlebar to provide sufficient space for access to the controls.

* * * * *